(12) United States Patent
Ma et al.

(10) Patent No.: US 12,059,954 B1
(45) Date of Patent: Aug. 13, 2024

(54) TRANSMISSION DEVICE FOR A PLANETARY GEAR TRAIN MULTI-GEAR HYBRID VEHICLE AND TRANSMISSION METHOD THEREFOR

(71) Applicants: HARBIN DONGAN AUTOMOTIVE ENGINE MANUFACTURING CO., LTD., Heilongjiang (CN); HARBIN DONGAN AUTO ENGINE CO., LTD., Heilongjiang (CN)

(72) Inventors: Jing Ma, Heilongjiang (CN); Wei Guan, Heilongjiang (CN); Lin Yang, Heilongjiang (CN); Junyuan Su, Heilongjiang (CN); Zhaopeng Chai, Heilongjiang (CN); Shutao Yao, Heilongjiang (CN); Zhangxia Zhou, Heilongjiang (CN); Xiaoyu Li, Heilongjiang (CN); Binlong Li, Heilongjiang (CN); Yanhui Zhao, Heilongjiang (CN); Xiaodong Zhang, Heilongjiang (CN); Jiqiu Bing, Heilongjiang (CN); Xiaoxing Yuan, Heilongjiang (CN); Yanyu He, Heilongjiang (CN); Mo Wang, Heilongjiang (CN); Ming Song, Heilongjiang (CN); Peng Zhang, Heilongjiang (CN)

(73) Assignees: HARBIN DONGAN AUTOMOTIVE ENGINE MANUFACTURING CO., LTD. (CN); HARBIN DONGAN AUTO ENGINE CO., LTD. (CN)

( * ) Notice: Subject to any disclaimer, the term of this patent is extended or adjusted under 35 U.S.C. 154(b) by 0 days.

(21) Appl. No.: 18/581,689

(22) Filed: Feb. 20, 2024

(30) Foreign Application Priority Data

Jul. 18, 2023 (CN) .......................... 202310882041.7

(51) Int. Cl.
*B60K 17/08* (2006.01)
*F16H 3/64* (2006.01)
(Continued)

(52) U.S. Cl.
CPC ............... *B60K 17/08* (2013.01); *F16H 3/64* (2013.01); *F16H 3/728* (2013.01); *F16H 3/78* (2013.01)

(58) Field of Classification Search
CPC .......... B60K 17/08; B60K 6/44; B60K 6/442; F16H 3/64; F16H 2200/0021; F16H 2200/201; F16H 2200/2038
See application file for complete search history.

(56) References Cited

U.S. PATENT DOCUMENTS

2023/0074162 A1\* 3/2023 Yu ............................ B60K 6/40
2023/0074324 A1\* 3/2023 Ma .......................... F16H 3/663

FOREIGN PATENT DOCUMENTS

CN 111546871 8/2020

\* cited by examiner

*Primary Examiner* — Derek D Knight
(74) *Attorney, Agent, or Firm* — Onello & Mello, LLP

(57) ABSTRACT

A transmission device for a planetary gear train multi-gear hybrid vehicle and a transmission method therefore are provided. An input end of an input shaft is connected to an engine, an output end of the input shaft is connected to a front-end motor through a first planetary gear train, and the input shaft is connected to an output shaft through a first clutch. The output shaft is connected to a third planetary gear train, the third planetary gear train is connected to a second clutch and a second planetary gear train, and the second clutch and the second planetary gear train are both connected to a third clutch. The second planetary gear train is connected to a rear-end motor.

10 Claims, 5 Drawing Sheets

(51) Int. Cl.
*F16H 3/72* (2006.01)
*F16H 3/78* (2006.01)

TRANSMISSION DEVICE FOR A PLANETARY GEAR TRAIN MULTI-GEAR HYBRID VEHICLE AND TRANSMISSION METHOD THEREFOR

CROSS-REFERENCE TO RELATED APPLICATION

This patent application claims the benefit and priority of Chinese Patent Application No. 202310882041.7 filed with the China National Intellectual Property Administration on Jul. 18, 2023, the disclosure of which is incorporated by reference herein in its entirety as part of the present application.

TECHNICAL FIELD

The present disclosure relates to a transmission device for a planetary gear train multi-gear hybrid vehicle and a transmission method therefore, belonging to the technical field of automobile parts.

BACKGROUND

Hybrid power is an important branch of electrification. The transmission device for a hybrid vehicle with compact structure and relatively simple control has gradually become one of the important development directions in the field of new energy.

However, with the transmission device for the existing hybrid vehicle, the speed ratio gradient range for two gears is limited, and the speed ratio range that can be achieved is small, which cannot meet the requirements of some vehicles for speed ratio gradient and speed ratio range in some working conditions.

SUMMARY

In order to solve the problems in the background, a transmission device for a planetary gear train multi-gear hybrid vehicle and a transmission method therefor is provided in the present disclosure.

In order to achieve the purpose above, the present disclosure provides the following technical solution: a transmission device for a planetary gear train multi-gear hybrid vehicle, including an input shaft, a housing, a front-end motor, a rear-end motor, an output shaft, a first clutch, a second clutch, a third clutch, a first planetary gear train, a second planetary gear train, and a third planetary gear train. An input end of the input shaft is connected to an engine, an output end of the input shaft is connected to the front-end motor through the first planetary gear train, and the input shaft is connected to the output shaft through the first clutch. The output shaft is connected to the third planetary gear train. The third planetary gear train is connected to the second clutch and the second planetary gear train. The second clutch and the second planetary gear train are both connected to the third clutch. The second planetary gear train is connected to the rear-end motor. A stator of the front-end motor, a stator of the rear-end motor, the third clutch, the first planetary gear train, and the third planetary gear train are all connected to the housing. The first planetary gear train includes a first sun gear, a first planetary gear, a first planet carrier, and a first outer ring gear. The first planet carrier is fixedly connected to both the input shaft and the first clutch. The first planetary gear is arranged on the first planet carrier. The first planetary gear is meshed with both the first sun gear and the first outer ring gear. The first outer ring gear is fixedly installed on the housing. The first sun gear is connected to a rotor of the front-end motor. The third planetary gear train includes a third sun gear, a third planetary gear, a third planet carrier, and a third outer ring gear. The third planet carrier is fixedly connected to both the output shaft and the second clutch. The third planetary gear is arranged on the third planet carrier. The third planetary gear is meshed with both the third sun gear and the third outer ring gear. The third outer ring gear is connected to the second planetary gear train. The third sun gear is connected to the housing. The second planetary gear train includes a second sun gear, a second planetary gear, a second planet carrier, and a second outer ring gear. The second planet carrier is fixedly connected to the third outer ring gear. The second planetary gear is arranged on the second planet carrier. The second planetary gear is meshed with both the second sun gear and the second outer ring gear. The second outer ring gear is connected to the second clutch and the third clutch. The second sun gear is connected to a rotor of the rear-end motor.

The present disclosure provides a transmission method for a first gear of an electric vehicle (EV) mode of the transmission device for a planetary gear train multi-gear hybrid vehicle, including:
  arranging the front-end motor and the engine in a non-operating state, the first clutch and the second clutch in a disengaged state, the third clutch in an engaged state, and the rear-end motor in an operating state;
  starting the rear-end motor to drive the second sun gear to rotate;
  driving, by the second sun gear, the second planetary gear to rotate;
  driving, by the second planetary gear, the second planet carrier to rotate;
  driving, by the second planet carrier, the third outer ring gear to rotate;
  driving, by the third outer ring gear, the third planetary gear to rotate;
  driving, by the third planetary gear, the third planet carrier to rotate; and
  driving, by the third planet carrier, the output shaft to rotate, so as to output power.

The present disclosure provides a transmission method for a second gear of an EV mode of the transmission device for a planetary gear train multi-gear hybrid vehicle, including:
  arranging the front-end motor and the engine in a non-operating state, the first clutch and the third clutch in a disengaged state, the second clutch in an engaged state, and the rear-end motor in an operating state;
  starting the rear-end motor to drive the second sun gear to rotate;
  driving, by the second sun gear, the second planetary gear to rotate;
  driving, by the second planetary gear, both the second planet carrier and the second outer ring gear to rotate;
  driving, by the second planet carrier, the third outer ring gear to rotate; driving, by the third outer ring gear, the third planetary gear to rotate; driving, by the third planetary gear, the third planet carrier to rotate; meanwhile driving, by second outer ring gear, the third planet carrier to rotate through the second clutch; and
  driving, by the third planet carrier, the output shaft to rotate, so as to output power.

The present disclosure provides a transmission method for a first gear of a series mode of the transmission device for a planetary gear train multi-gear hybrid vehicle, including:

arranging all the front-end motor, the rear-end motor, and the engine in an operating state, the first clutch and the second clutch in a disengaged state, and the third clutch in an engaged state;

starting the engine to drive the input shaft to rotate;

driving, by the input shaft, the first planet carrier to rotate;

driving, by the first planet carrier, the first planetary gear to rotate;

driving, by the first planetary gear, the first sun gear to rotate;

driving, by the first sun gear, the rotor of the front-end motor to rotate, and storing energy in a battery;

receiving, by the rear-end motor, the energy of the battery to drive the second sun gear to rotate;

driving, by the second sun gear, the second planetary gear to rotate;

driving, by the second planetary gear, the second planet carrier to rotate;

driving, by the second planet carrier, the third outer ring gear to rotate;

driving, by the third outer ring gear, the third planetary gear to rotate;

driving, by the third planetary gear, the third planet carrier to rotate; and driving, by the third planet carrier, the output shaft to rotate, so as to output power.

The present disclosure provides a transmission method for a second gear of a series mode of the transmission device for a planetary gear train multi-gear hybrid vehicle, including:

arranging all the front-end motor, the rear-end motor and the engine in an operating state, the first clutch and the third clutch in a disengaged state, and the second clutch in an engaged state;

starting the engine to drive the input shaft to rotate;

driving, by the input shaft, the first planet carrier to rotate;

driving, by the first planet carrier, the first planetary gear to rotate;

driving, by the first planetary gear, the first sun gear to rotate;

driving, by the first sun gear, the rotor of the front-end motor to rotate, and storing energy in a battery;

receiving, by the rear-end motor, the energy of the battery to drive a second sun gear to rotate;

driving, by the second sun gear, the second planetary gear to rotate;

driving, by the second planetary gear, both the second planet carrier and the second outer ring gear to rotate;

driving, by the second planet carrier, the third outer ring gear to rotate; driving, by the third outer ring gear, the third planetary gear to rotate; driving, by the third planetary gear, the third planet carrier to rotate; meanwhile driving, by the second outer ring gear, the third planet carrier to rotate through the second clutch; and driving, by the third planet carrier, the output shaft to rotate, so as to output power.

The present disclosure provides a transmission method of a first gear of a parallel mode of the transmission device for a planetary gear train multi-gear hybrid vehicle, including:

arranging both the rear-end motor and the engine in an operating state, the first clutch and the third clutch in an engaged state, the second clutch in a disengaged state, and the front-end motor in a non-operating state;

starting the rear-end motor to drive the second sun gear to rotate;

driving, by the second sun gear, the second planetary gear to rotate;

driving, by the second planetary gear, the second planet carrier to rotate;

driving, by the second planet carrier, the third outer ring gear to rotate;

driving, by the third outer ring gear, the third planetary gear to rotate;

driving, by the third planetary gear, the third planet carrier to rotate;

transmitting, by the engine, power to the input shaft;

driving, by the input shaft, the third planet carrier to rotate through the first clutch; and driving, by the third planet carrier, the output shaft to rotate, so as to output the power.

The present disclosure provides a transmission method for a second gear of a parallel mode of the transmission device for a planetary gear train multi-gear hybrid vehicle, including:

arranging both the rear-end motor and the engine in an operating state, the first clutch and the second clutch in an engaged state, the third clutch in a disengaged state, and the front-end motor in a non-operating state;

starting the rear-end motor to drive the second sun gear to rotate;

driving, by the second sun gear, the second planetary gear to rotate;

driving, by the second planetary gear, both the second planet carrier and the second outer ring gear to rotate;

driving, by the second planet carrier, the third outer ring gear to rotate; driving, by the third outer ring gear, the third planetary gear to rotate; driving, by the third planetary gear, the third planet carrier to rotate; meanwhile driving, by the second outer ring gear, the third planet carrier to rotate through the second clutch;

transmitting, by the engine, power to the input shaft;

driving, by the input shaft, the third planet carrier to rotate through the first clutch; and driving, by the third planet carrier, the output shaft to rotate, so as to output the power.

The present application provides a transmission method for a direct-drive gear of the transmission device for a planetary gear train multi-gear hybrid vehicle, including:

arranging the engine in an operating state, all the first clutch, the second clutch, and the third clutch in a disengaged state, and the front-end motor and the rear-end motor in a non-operating state;

transmitting, by the engine, power to the input shaft; and driving, by the input shaft, the output shaft to rotate through the first clutch, so as to output the power.

The present disclosure provides a transmission method for a brake recovery gear of the transmission device for a planetary gear train multi-gear hybrid vehicle, including:

arranging the rear-end motor in an operating state, the third clutch in an engaged state, the first clutch and the second clutch in a disengaged state, and both the front-end motor and the engine in a non-operating state;

driving, by the output shaft, the third planet carrier to rotate;

driving, by the third planet carrier, the third outer ring gear to rotate;

driving, by the third outer ring gear, the second planet carrier to rotate;

driving, by the second planet carrier, the second planetary gear to rotate;

driving, by the second planetary gear, the second sun gear to rotate; and driving, by the second sun gear, the rotor of the rear-end motor to rotate, and storing energy in a battery.

The present disclosure provides a transmission method for an idle power generation gear of the transmission device for a planetary gear train multi-gear hybrid vehicle, including:

arranging both the front-end motor and the engine in an operating state, all the first clutch, the second clutch and the third clutch in a disengaged state, and the rear-end motor in a non-operating state;

transmitting, by the engine, power to the input shaft;

driving, by the input shaft, the first planet carrier to rotate;

driving, by the first planet carrier, the first planetary gear to rotate;

driving, by the first planetary gear, the first sun gear to rotate; and driving, by the first sun gear, the rotor of the front-end motor to rotate, and storing energy in a battery.

Compared with the prior art, the present disclosure achieves beneficial effects as follows.

The present disclosure is compact in structure, convenient to control, low in cost and machining difficulty of parts. The clutches and the planetary gear trains in the present disclosure can be combined in various types, the assembly is simple, few parts are used, and large speed ratio change and wide transmission ratio range can be achieved. The transmission device in the present disclosure has the characteristics of reasonable structure, simple assembly, a lot of achievable modes, and high cost performance, and is convenient to use and popularize. Meanwhile, the motors, the clutches and the planetary gear trains are spatially staggered, so that the efficiency of the transmission device can be effectively increased, and the responsiveness and smoothness are optimized.

DETAILED DESCRIPTION OF THE EMBODIMENTS

Figure 1:
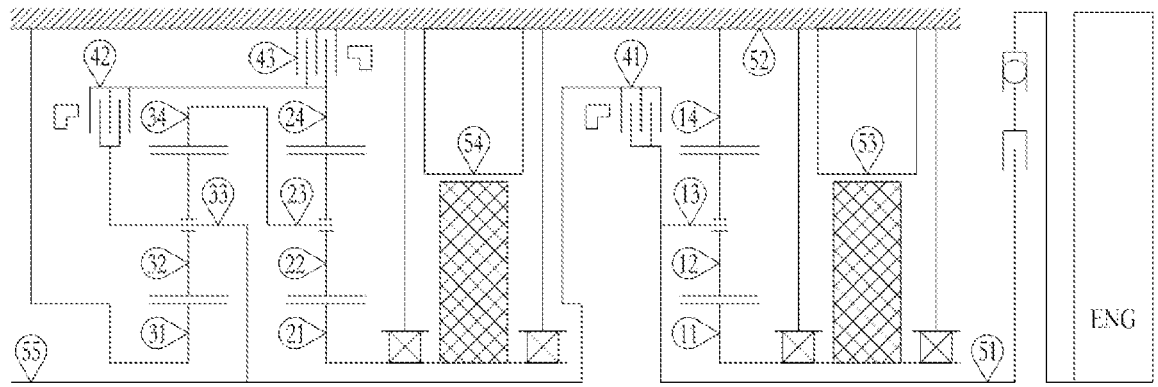
FIG. 1 is a structural diagram of the transmission device for a planetary gear train multi-gear hybrid vehicle according to an embodiment of the present disclosure.
Figure 2:
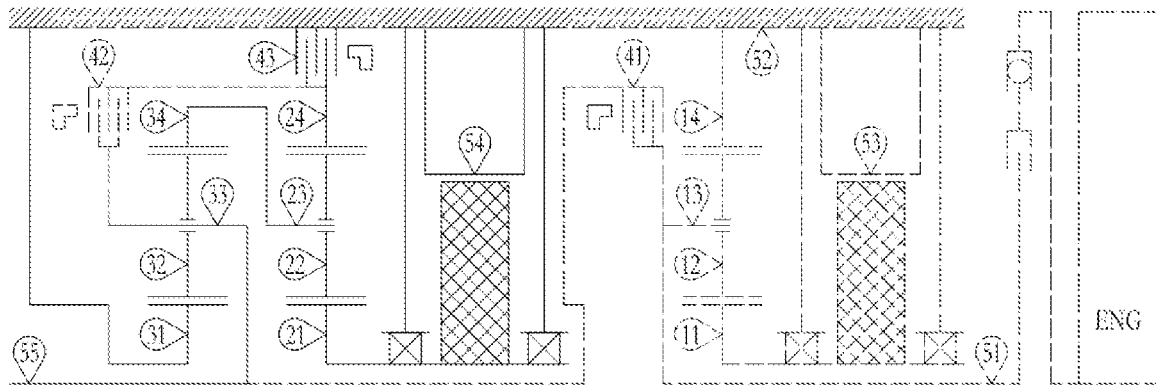
FIG. 2 is a structural diagram of a first gear of an EV mode according to an embodiment of the present disclosure.
Figure 3:
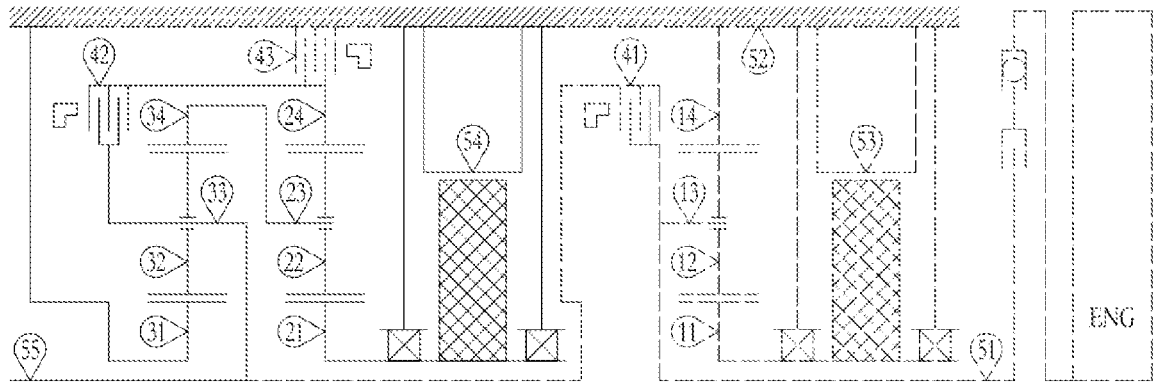
FIG. 3 is a structural diagram of a second gear of an EV mode according to an embodiment of the present disclosure.
Figure 4:
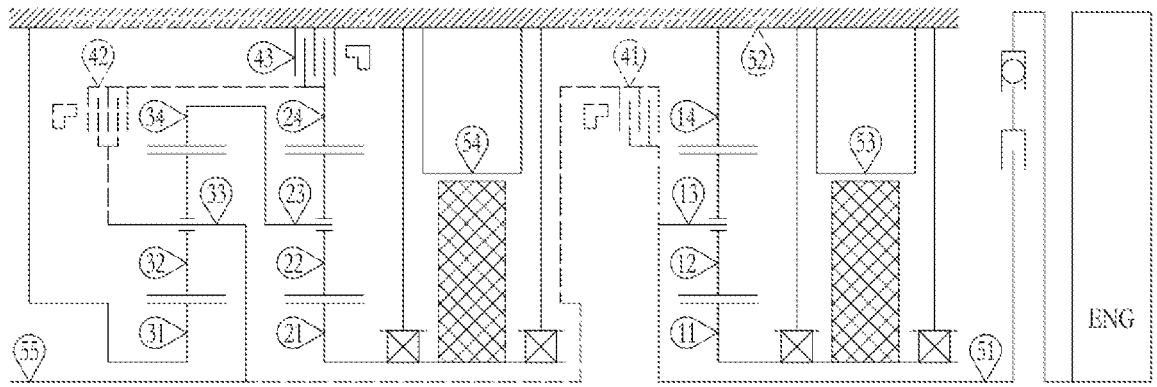
FIG. 4 is a structural diagram of a first gear of a series mode according to an embodiment of the present disclosure.
Figure 5:
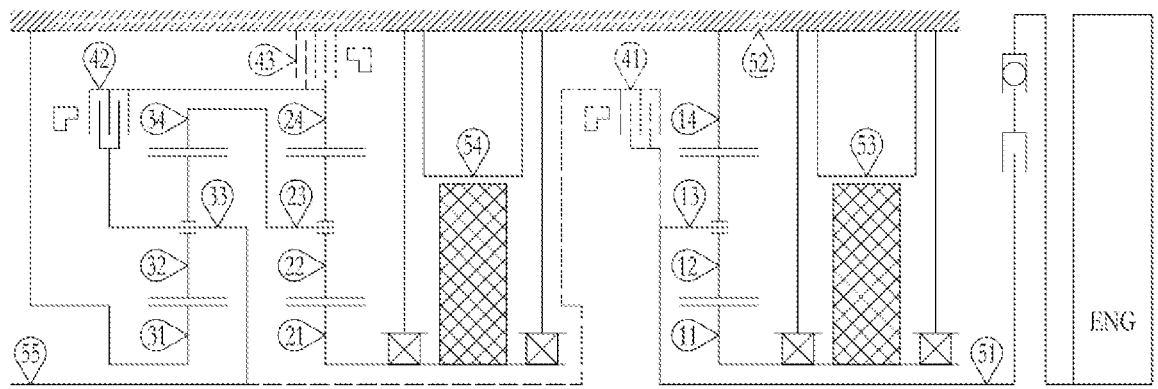
FIG. 5 is a structural diagram of a second gear of a series mode according to an embodiment of the present disclosure.
Figure 6:
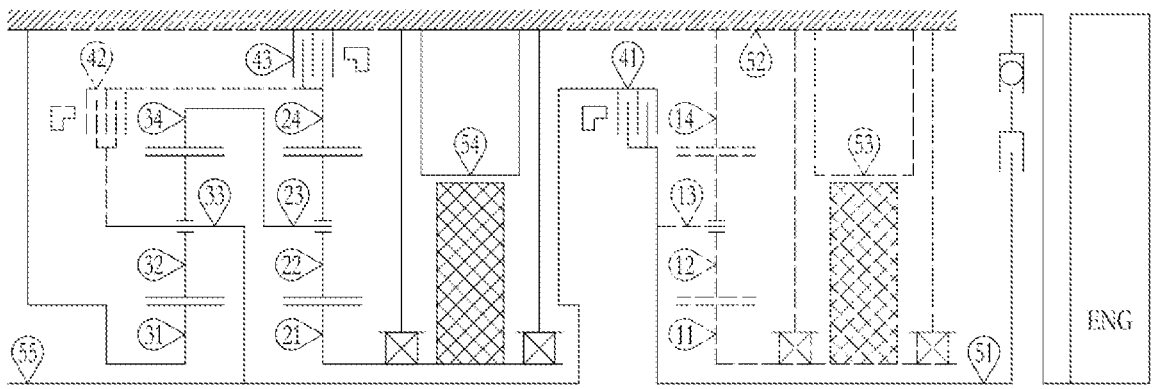
FIG. 6 is a structural diagram of a first gear of a parallel mode according to an embodiment of the present disclosure.
Figure 7:
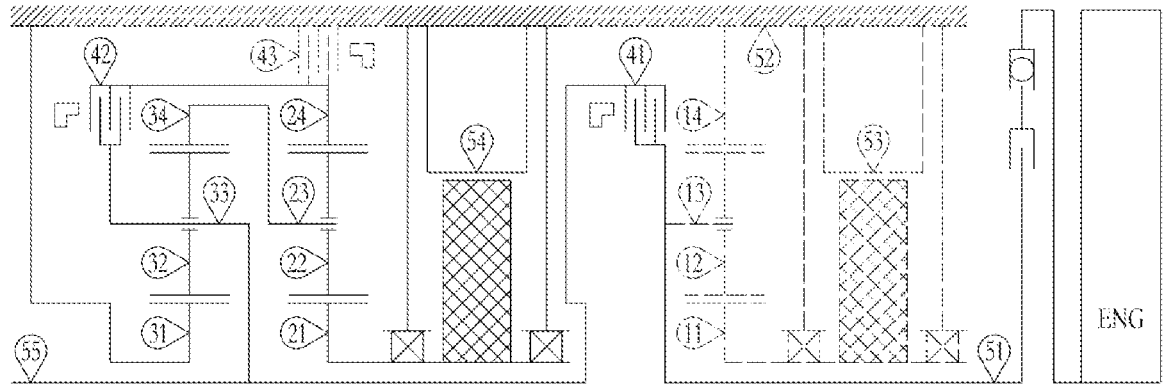
FIG. 7 is a structural diagram of a second gear of a parallel mode according to an embodiment of the present disclosure.
Figure 8:
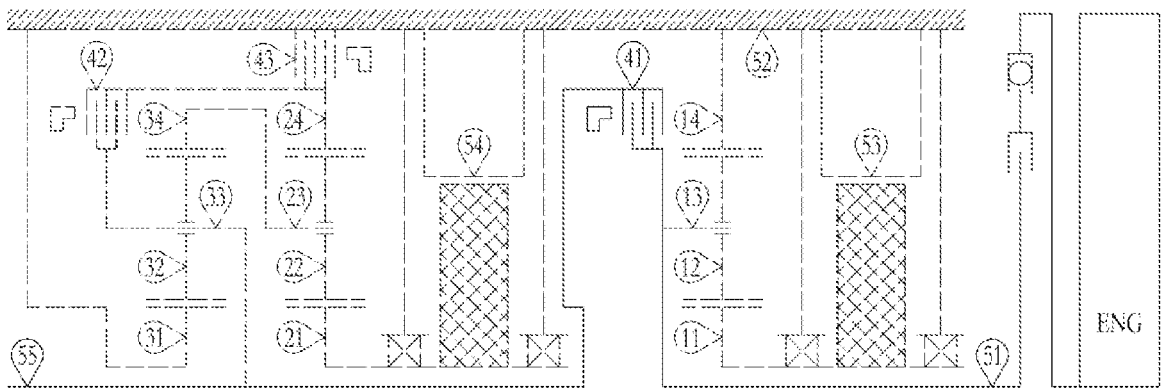
FIG. 8 is a structural diagram of a direct-drive gear according to an embodiment of the present disclosure.
Figure 9:
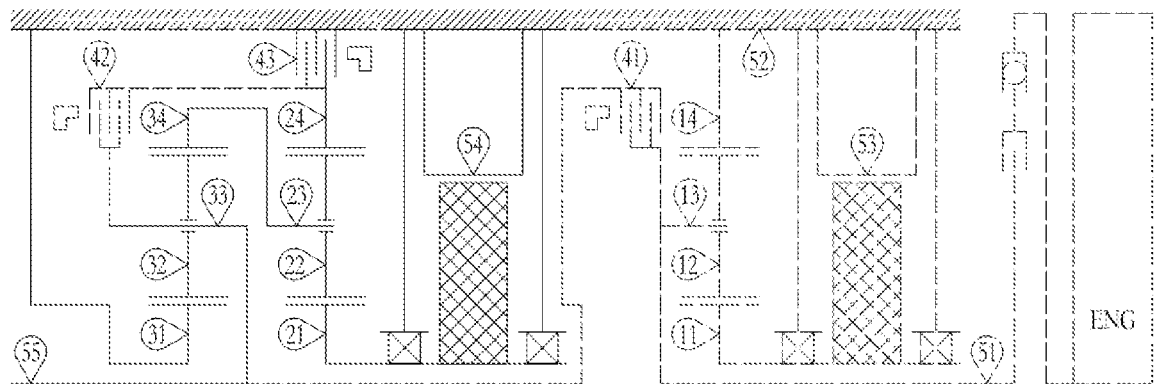
FIG. 9 is a structural diagram of a brake recovery gear according to an embodiment of the present disclosure.
Figure 10:
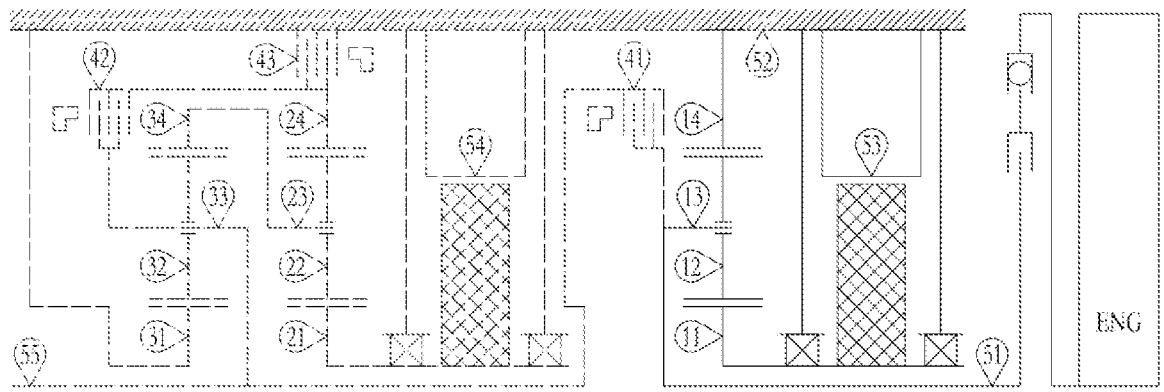
FIG. 10 is a structural diagram of an idle power generation gear according to an embodiment of the present disclosure.
Figure 11:
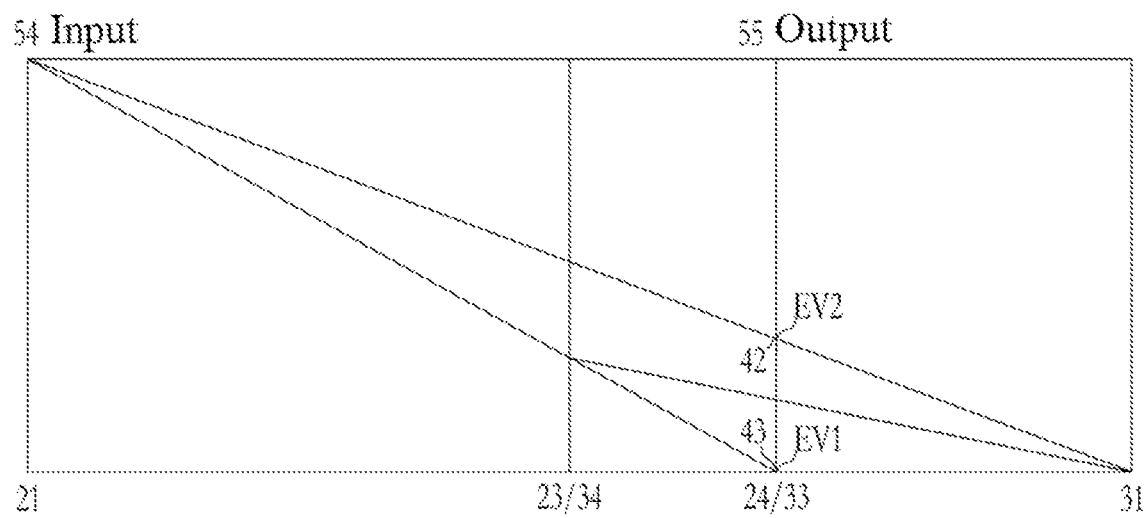
FIG. 11 is a lever principle diagram of the transmission device for a planetary gear train multi-gear hybrid vehicle according to an embodiment of the present disclosure.
Figure 12:
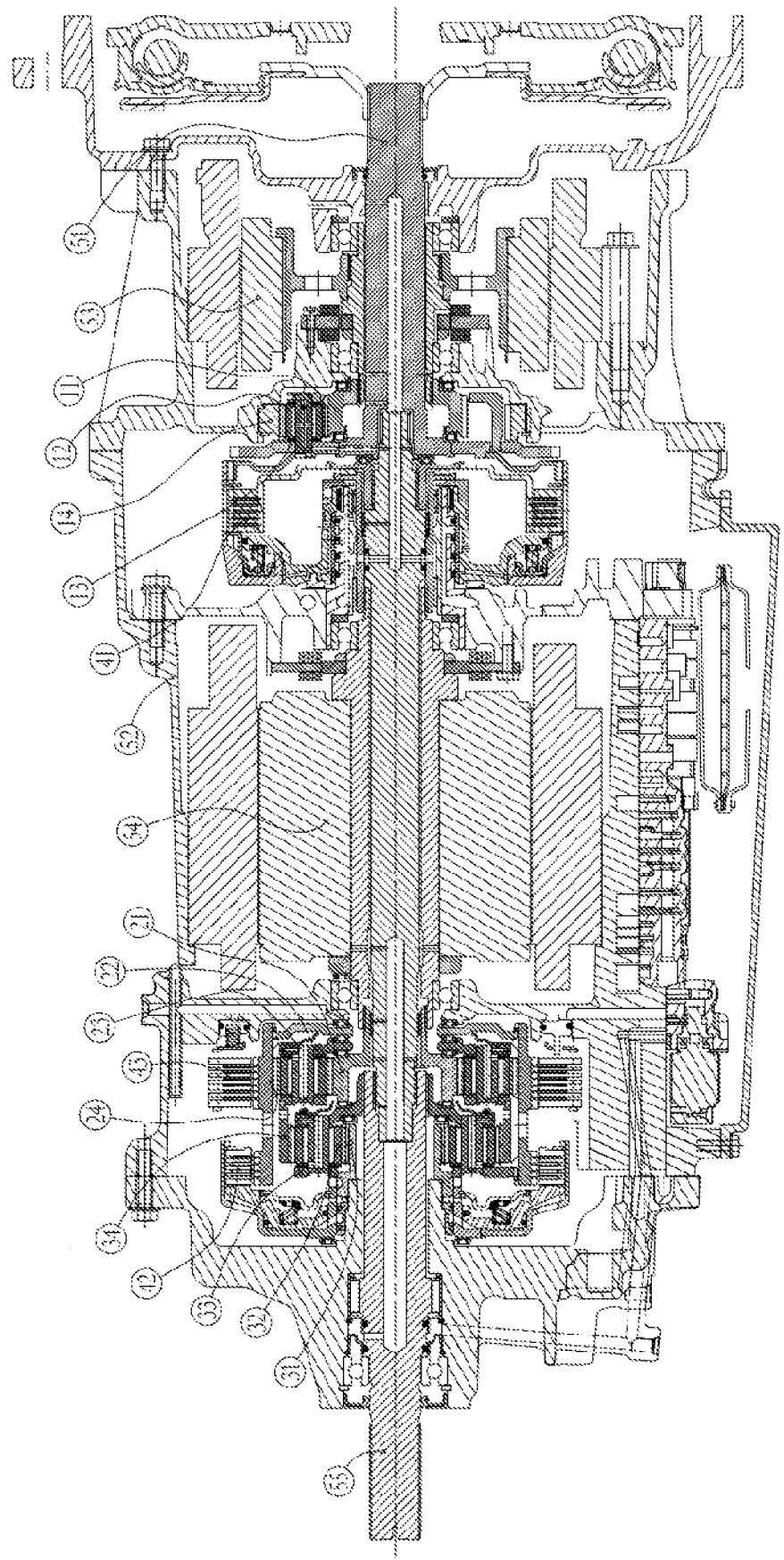
FIG. 12 is a structural schematic diagram of the transmission device for a planetary gear train multi-gear hybrid vehicle according to an embodiment of the present disclosure.

The following clearly and completely describes the technical solutions in the embodiments of the present disclosure with reference to the attached figures of the embodiments of the present disclosure. Apparently, the described embodiments are merely a part rather than all of the embodiments of the present disclosure. Based on the embodiments in the present disclosure, all other embodiments obtained by those skilled in the art without creative efforts fall within the scope of protection claimed in the present disclosure.

A transmission device for a planetary gear train multi-gear hybrid vehicle includes an input shaft 51, a housing 52, a front-end motor 53, a rear-end motor 54, an output shaft 55, a first clutch 41, a second clutch 42, a third clutch 43, a first planetary gear train, a second planetary gear train, and a third planetary gear train. The housing 52, the front-end motor 53, the rear-end motor 54, the first clutch 41, the second clutch 42, the third clutch 43, the first planetary gear train, the second planetary gear train and the third planetary gear train are all sleeved outside the input shaft 51 and the output shaft 55. An input end of the input shaft 51 is connected to an engine to serve as an input of the transmission device. An output end of the input shaft 51 is connected to the front-end motor 53 through the first planetary gear train. The input shaft is connected to the output shaft 55 through the first clutch 41. The output shaft 55 is connected to the third planetary gear train. The third planetary gear train is connected to the second clutch 42 and the second planetary gear train. The second clutch 42 and the second planetary gear train are both connected to the third clutch 43. The second planetary gear train is connected to the rear-end motor 54. A stator of the front-end motor 53, a stator of the rear-end motor 54, the third clutch 43, the first planetary gear train, and the third planetary gear train are all connected to the housing 52.

The first planetary gear train includes a first sun gear 11, a first planetary gear 12, a first planet carrier 13, and a first outer ring gear 14. The first planet carrier 13 is fixedly connected to the input shaft 51 and the first clutch 41. The first planetary gear 12 is arranged on the first planet carrier 13. The first planetary gear 12 is meshed with the first sun gear 11 and the first outer ring gear 14. The first outer ring gear 14 is fixedly installed on the housing 52. The first sun gear 11 is connected to a rotor of the front-end motor 53.

The third planetary gear train includes a third sun gear 31, a third planetary gear 32, a third planet carrier 33, and a third outer ring gear 34. The third planet carrier 33 is fixedly connected to the output shaft 55 and the second clutch 42. The third planetary gear 32 is arranged on the third planet carrier 33. The third planetary gear 32 is meshed with the third sun gear 31 and the third outer ring gear 34. The third outer ring gear 34 is connected to the second planetary gear train. The third sun gear 31 is connected to the housing 52.

The second planetary gear train includes a second sun gear 21, a second planetary gear 22, a second planet carrier 23, and a second outer ring gear 24. The second planet carrier 23 is fixedly connected to the third outer ring gear 34. The second planetary gear 22 is arranged on the second planet carrier 23. The second planetary gear 22 is meshed with the second sun gear 21 and the second outer ring gear 24. The second outer ring gear 24 is connected to the second clutch 42 and the third clutch 43. The second sun gear 21 is connected to a rotor of the rear-end motor 54.

According to the present disclosure, through different combinations of the first clutch 41, the second clutch 42 and the third clutch 43, as well as different operating states of the engine, the front-end motor 53 and the rear-end motor 54, different speed ratios of the second planetary gear train and the third planetary gear train can be achieved, thus a first gear of an EV mode, a first gear of a series mode, a second gear of the EV mode, a second gear of the series mode, a first gear of a parallel mode, a second gear of the parallel mode, a direct-drive gear, a brake recovery gear, and an idle power generation gear can be achieved.

The present disclosure provides a transmission method for a first gear of an EV mode of the transmission device for a planetary gear train multi-gear hybrid vehicle, including the following steps.

S1. The front-end motor 53 and the engine are arranged in a non-operating state, the first clutch 41 and the second clutch 42 are arranged in a disengaged state, the third clutch 43 is arranged in an engaged state, and the rear-end motor 54 is arranged in an operating state.

S2. The rear-end motor 54 is started to drive the second sun gear 21 to rotate.

S3. As the second outer ring gear 24 is fixed by the third clutch 43, the second planetary gear 22 is driven to rotate by the second sun gear 21.

S4. The second planet carrier 23 is driven to rotate by the second planetary gear 22.

S5. The third outer ring gear 34 is driven to rotate by the second planet carrier 23.

S6. As the third sun gear 31 is fixed to the housing 52, the third planetary gear 32 is driven to rotate by the third outer ring gear 34.

S7. The third planet carrier 33 is driven to rotate by the third planetary gear 32.

S8. The output shaft 55 is driven to rotate by the third planet carrier 33, so as to output power.

The present disclosure provides a transmission method for a second gear of an EV mode of the transmission device for a planetary gear train multi-gear hybrid vehicle, including the following steps.

S1. The front-end motor 53 and the engine are arranged in a non-operating state, the first clutch 41 and a third clutch 43 are arranged in a disengaged state, the second clutch 42 is arranged in an engaged state, and the rear-end motor 54 is arranged in an operating state. The second planetary gear train and the third planetary gear train are driven at a fixed speed ratio.

S2. The rear-end motor 54 is started to drive a second sun gear 21 to rotate.

S3. The second planetary gear 22 is driven to rotate by the second sun gear 21.

S4. The second planet carrier 23 and the second outer ring gear 24 are both driven to rotate by the second planetary gear 22.

S5. The third outer ring gear 34 is driven to rotate by the second planet carrier 23. As the third sun gear 31 is fixed to the housing 52, the third planetary gear 32 is driven to rotate by the third outer ring gear 34, the third planet carrier 33 is driven to rotate by the third planetary gear 32, meanwhile the third planet carrier 33 is driven to rotate by the second outer ring gear 24 through the second clutch 42.

S6. The output shaft 55 is driven to rotate by the third planet carrier 33, so as to output power.

The present disclosure provides a transmission method of a first gear of a series mode of the transmission device for a planetary gear train multi-gear hybrid vehicle, including the following steps.

S1. The front-end motor 53, the rear-end motor 54 and the engine are all arranged in an operating state, the first clutch 41 and the second clutch 42 are arranged in a disengaged state, and the third clutch 43 is arranged in an engaged state.

S2. The engine is started to drive the input shaft 51 to rotate.

S3. The first planet carrier 13 is driven to rotate by the input shaft 51.

S4. As the first outer ring gear 14 is fixed to the housing 52, the first planetary gear 12 is driven to rotate by the first planet carrier 13.

S5. The first sun gear 11 is driven to rotate by the first planetary gear 12.

S6. The rotor of the front-end motor 53 is driven to rotate by the first sun gear 11, and energy is stored in a battery.

S7. The energy of the battery is received by the rear-end motor 54, so as to drive the second sun gear 21 to rotate.

S8. As the second outer ring gear 24 is fixed by the third clutch 43, the second planetary gear 22 is driven to rotate by the second sun gear 21.

S9. The second planet carrier 23 is driven to rotate by the second planetary gear 22.

S10. The third outer ring gear 34 is driven to rotate by the second planet carrier 23.

S11. As the third sun gear 31 is fixed to the housing 52, the third planetary gear 32 is driven to rotate by the third outer ring gear 34.

S12. The third planet carrier 33 is driven to rotate by the third planetary gear 32.

S13. The output shaft 55 is driven to rotate by the third planet carrier 33, so as to output power.

The present disclosure provides a transmission method of a second gear of a series mode of the transmission device for a planetary gear train multi-gear hybrid vehicle, including the following steps.

S1. The front-end motor 53, the rear-end motor 54 and the engine are all arranged in an operating state, the first clutch 41 and the third clutch 43 are arranged in a disengaged state, and the second clutch 42 is arranged in an engaged state.

S2. The engine is started to drive the input shaft 51 to rotate.

S3. The first planet carrier 13 is driven to rotate by the input shaft 51.

S4. As the first outer ring gear 14 is fixed to the housing 52, the first planetary gear 12 is driven to rotate by the first planet carrier 13.

S5. The first sun gear 11 is driven to rotate by the first planetary gear 12.

S6. The rotor of the front-end motor 53 is driven to rotate by the first sun gear 11, and energy is stored in a battery.

S7. The energy of the battery is received by the rear-end motor 54, so as to drive the second sun gear 21 to rotate.

S8. The second planetary gear 22 is driven to rotate by the second sun gear 21.

S9. The second planet carrier 23 and the second outer ring gear 24 are both driven to rotate by the second planetary gear 22.

S10. The third outer ring gear 34 is driven to rotate by the second planet carrier 23. As the third sun gear 31 is fixed to the housing 52, the third planetary gear 32 is driven to rotate by the third outer ring gear 34, the third planet carrier 33 is driven to rotate by the third planetary gear 32, meanwhile the third planet carrier 33 is driven to rotate by the second outer ring gear 24 through the second clutch 42.

S11. The output shaft 55 is driven to rotate by the third planet carrier 33, so as to output power.

The present disclosure provides a transmission method of a first gear of a parallel mode of the transmission device for a planetary gear train multi-gear hybrid vehicle, including the following steps.

S1. The rear-end motor 54 and the engine are both arranged in an operating state to serve as power output of the transmission device together, the first clutch 41 and the third clutch 43 are arranged in an engaged state, the second clutch 42 is arranged in a disengaged state, and the front-end motor 53 is arranged in a non-operating state.

S2. The rear-end motor 54 is started to drive a second sun gear 21 to rotate.

S3. As the second outer ring gear 24 is fixed by the third clutch 43, the second planetary gear 22 is driven to rotate by the second sun gear 21.

S4. The second planet carrier 23 is driven to rotate by the second planetary gear 22.

S5: The third outer ring gear 34 is driven to rotate by the second planet carrier 23.

S6. As the third sun gear 31 is fixed to the housing 52, the third planetary gear 32 is driven to rotate by the third outer ring gear 34.

S7. The third planet carrier 33 is driven to rotate by the third planetary gear 32.

S8. Power is transmitted to the input shaft 51 by the engine.

S9. The third planet carrier 33 is driven to rotate by the input shaft 51 through the first clutch 41.

S10. The output shaft 55 is driven to rotate by the third planet carrier 33, so as to output the power.

The present disclosure provides a transmission method of a second gear of a parallel mode of the transmission device for a planetary gear train multi-gear hybrid vehicle, including the following steps.

S1. The rear-end motor 54 and the engine are both arranged in an operating state to serve as power output of the transmission device together, the first clutch 41 and the second clutch 42 are arranged in an engaged state, the third clutch 43 is arranged in a disengaged state, and the front-end motor 53 is arranged in a non-operating state.

S2. The rear-end motor 54 is started to drive the second sun gear 21 to rotate.

S3. The second planetary gear 22 is driven to rotate by the second sun gear 21.

S4. The second planet carrier 23 and the second outer ring gear 24 are both driven to rotate by the second planetary gear 22.

S5. The third outer ring gear 34 is driven to rotate by the second planet carrier 23. As the third sun gear 31 is fixed to the housing 52, the third planetary gear 32 is driven to rotate by the third outer ring gear 34, the third planet carrier 33 is driven to rotate by the third planetary gear 32, meanwhile the third planet carrier 33 is driven to rotate by the second outer ring gear 24 through the second clutch 42.

S6. Power is transmitted to the input shaft 51 by the engine.

S7. The third planet carrier 33 is driven to rotate by the input shaft 51 through the first clutch 41.

S8. The output shaft 55 is driven to rotate by the third planet carrier 33, so as to output the power.

The present disclosure provides a transmission method of a direct-drive gear of the transmission device for a planetary gear train multi-gear hybrid vehicle, including the following steps.

S1. The engine is arranged in an operating state, the first clutch 41, the second clutch 42 and the third clutch 43 are all arranged in a disengaged state, and the front-end motor 53 and the rear-end motor 54 are arranged in a non-operating state.

S2. Power is transmitted to the input shaft 51 by the engine.

S3. The output shaft 55 is driven to rotate by the input shaft 51 through the first clutch 41, so as to output the power.

The present disclosure provides a transmission method of a brake recovery gear of the transmission device for a planetary gear train multi-gear hybrid vehicle, including the following steps.

S1. The rear-end motor 54 is arranged in an operating state, the third clutch 43 is arranged in an engaged state, the first clutch 41 and the second clutch 42 are arranged in a disengaged state, and the front-end motor 53 and the engine are both arranged in a non-operating state.

S2. The third planet carrier 33 is driven to rotate by the output shaft 55.

S3. As the third sun gear 31 is fixed to the housing 52, the third outer ring gear 34 is driven to rotate by the third planet carrier 33.

S4. The second planet carrier 23 is driven to rotate by the third outer ring gear 34.

S5. As the second outer ring gear 24 is fixed by the third clutch 43, the second planetary gear 22 is driven to rotate by the second planet carrier 23.

S6. The second sun gear 21 is driven to rotate by the second planetary gear 22.

S7. The rotor of the rear-end motor 54 is driven to rotate by the second sun gear 21, and energy is stored in a battery.

The present disclosure provides a transmission method of an idle power generation gear of the transmission device for a planetary gear train multi-gear hybrid vehicle, including the following steps.

S1. The front-end motor 53 and the engine are both arranged in an operating state, the first clutch 41, the second clutch 42 and the third clutch 43 are all arranged in a disengaged state, and the rear-end motor 54 is arranged in a non-operating state.

S2. Power is transmitted to the input shaft 51 by the engine.

S3. The first planet carrier 13 is driven to rotate by the input shaft 51.

S4. As the first outer ring gear 14 is fixed to the housing 52, the first planetary gear 12 is driven to rotate by the first planet carrier 13.

S5. The first sun gear 11 is driven to rotate by the first planetary gear 12.

S6. The rotor of the front-end motor 53 is driven to rotate by the first sun gear 11, and energy is stored in a battery.

The present disclosure not only can achieve various power combinations of the engine and the motor, but also gives full play to the respective advantages of the engine and the motor, which not only can meet the cruising range requirements and has low infrastructure requirements, like traditional fuel vehicles, but also can meet the economic requirements and balance various requirements, like pure electric vehicles. By means of multiple planetary gear trains, significant speed ratio change can be achieved, and different power combination modes can be realized in limited space with few parts, and the cooperation of clutches.

It is apparent to those skilled in the art that the present disclosure is not limited to the details of the above exemplary embodiments and the present disclosure can be realized in other specific forms without departing from the spirit or basic characteristics of the present disclosure. Therefore, the embodiments should be considered as exemplary and non-limiting in all aspects, and the scope of the present disclosure is defined by the appended claims rather than the above description, so it is intended to embrace all changes that fall within the meaning and range of equivalents of the claims. Any reference signs in the claims should not be regarded as limiting the claims involved.

In addition, it should be understood that although this specification is described in terms of embodiments, not every embodiment only contains an independent technical solution, and this description of the specification is only for clarity. Those skilled in the art should take the specification as a whole, and the technical solutions in various embodiments can also be appropriately combined to form other embodiments that can be understood by those skilled in the art.

What is claimed is:

1. A transmission device for a planetary gear train multi-gear hybrid vehicle, comprising:
    an input shaft (51), a housing (52), a front-end motor (53), a rear-end motor (54), an output shaft (55), a first clutch (41), a second clutch (42), a third clutch (43), a first planetary gear train, a second planetary gear train, and a third planetary gear train;
    an input end of the input shaft (51) is connected to an engine, an output end of the input shaft (51) is connected to the front-end motor (53) through the first planetary gear train, and the input shaft is connected to the output shaft (55) through the first clutch (41);
    the output shaft (55) is connected to the third planetary gear train;
    the third planetary gear train is connected to the second clutch (42) and the second planetary gear train;
    the second clutch (42) and the second planetary gear train are both connected to the third clutch (43);
    the second planetary gear train is connected to the rear-end motor (54);
    a stator of the front-end motor (53), a stator of the rear-end motor (54), the third clutch (43), the first planetary gear train, and the third planetary gear train are all connected to the housing (52);
    the first planetary gear train comprises a first sun gear (11), a first planetary gear (12), a first planet carrier (13), and a first outer ring gear (14);
    the first planet carrier (13) is fixedly connected to both the input shaft (51) and the first clutch (41);
    the first planetary gear (12) is arranged on the first planet carrier (13);
    the first planetary gear (12) is meshed with both the first sun gear (11) and the first outer ring gear (14);
    the first outer ring gear (14) is fixedly installed on the housing (52);
    the first sun gear (11) is connected to a rotor of the front-end motor (53);
    the third planetary gear train comprises a third sun gear (31), a third planetary gear (32), a third planet carrier (33), and a third outer ring gear (34);
    the third planet carrier (33) is fixedly connected to both the output shaft (55) and the second clutch (42);
    the third planetary gear (32) is arranged on the third planet carrier (33);
    the third planetary gear (32) is meshed with both the third sun gear (31) and the third outer ring gear (34), the third outer ring gear (34) is connected to the second planetary gear train; the third sun gear (31) is connected to the housing (52);
    the second planetary gear train comprises a second sun gear (21), a second planetary gear (22), a second planet carrier (23), and a second outer ring gear (24);
    the second planet carrier (23) is fixedly connected to the third outer ring gear (34);
    the second planetary gear (22) is arranged on the second planet carrier (23);
    the second planetary gear (22) is meshed with both the second sun gear (21) and the second outer ring gear (24);
    the second outer ring gear (24) is connected to the second clutch (42) and the third clutch (43); and
    the second sun gear (21) is connected to a rotor of the rear-end motor (54).

2. A transmission method for a first gear of an electric vehicle (EV) mode of the transmission device for a planetary gear train multi-gear hybrid vehicle according to claim 1, comprising:
    arranging the front-end motor (53) and the engine in a non-operating state, the first clutch (41) and the second clutch (42) in a disengaged state, the third clutch (43) in an engaged state, and the rear-end motor (54) in an operating state;
    starting the rear-end motor (54) to drive the second sun gear (21) to rotate;
    driving, by the second sun gear (21), the second planetary gear (22) to rotate;
    driving, by the second planetary gear (22), the second planet carrier (23) to rotate;
    driving, by the second planet carrier (23), the third outer ring gear (34) to rotate;
    driving, by the third outer ring gear (34), the third planetary gear (32) to rotate;
    driving, by the third planetary gear (32), the third planet carrier (33) to rotate; and
    driving, by the third planet carrier (33), the output shaft (55) to rotate, so as to output power.

3. A transmission method for a second gear of an EV mode of the transmission device for a planetary gear train multi-gear hybrid vehicle according to claim 1, comprising:
    arranging the front-end motor (53) and the engine in a non-operating state, the first clutch (41) and the third clutch (43) in a disengaged state, the second clutch (42) in an engaged state, and the rear-end motor (54) in an operating state;
    starting the rear-end motor (54) to drive the second sun gear (21) to rotate;
    driving, by the second sun gear (21), the second planetary gear (22) to rotate;
    driving, by the second planetary gear (22), both the second planet carrier (23) and the second outer ring gear (24) to rotate;
    driving, by the second planet carrier (23), the third outer ring gear (34) to rotate; driving, by the third outer ring gear (34), the third planetary gear (32) to rotate; driving, by the third planetary gear (32), the third planet carrier (33) to rotate, meanwhile driving, by the second outer ring gear (24), the third planet carrier (33) to rotate through the second clutch (42); and
    driving, by the third planet carrier (33), the output shaft (55) to rotate, so as to output power.

4. A transmission method for a first gear of a series mode of the transmission device for a planetary gear train multi-gear hybrid vehicle according to claim 1, comprising:

arranging all the front-end motor (53), the rear-end motor (54) and the engine in an operating state, the first clutch (41) and the second clutch (42) in a disengaged state, and the third clutch (43) in an engaged state;

starting the engine to drive the input shaft (51) to rotate;

driving, by the input shaft (51), the first planet carrier (13) to rotate;

driving, by the first planet carrier (13), the first planetary gear (12) to rotate;

driving, by the first planetary gear (12), the first sun gear (11) to rotate;

driving, by the first sun gear (11), the rotor of the front-end motor (53) to rotate, and storing energy in a battery;

receiving, by the rear-end motor (54), the energy of the battery to drive the second sun gear (21) to rotate;

driving, by the second sun gear (21), the second planetary gear (22) to rotate;

driving, by the second planetary gear (22), the second planet carrier (23) to rotate;

driving, by the second planet carrier (23), the third outer ring gear (34) to rotate;

driving, by the third outer ring gear (34), the third planetary gear (32) to rotate;

driving, by the third planetary gear (32), the third planet carrier (33) to rotate; and driving, by the third planet carrier (33), the output shaft (55) to rotate, so as to output power.

5. A transmission method for a second gear of a series mode of the transmission device for a planetary gear train multi-gear hybrid vehicle according to claim 1, comprising:

arranging all the front-end motor (53), the rear-end motor (54) and the engine in an operating state, the first clutch (41) and the third clutch (43) in a disengaged state, and the second clutch (42) in an engaged state;

starting the engine to drive the input shaft (51) to rotate;

driving, by the input shaft (51), the first planet carrier (13) to rotate;

driving, by the first planet carrier (13), the first planetary gear (12) to rotate;

driving, by the first planetary gear (12), the first sun gear (11) to rotate;

driving, by the first sun gear (11), the rotor of the front-end motor (53) to rotate, and storing energy in a battery;

receiving, by the rear-end motor (54), the energy of the battery to drive a second sun gear (21) to rotate;

driving, by the second sun gear (21), the second planetary gear (22) to rotate;

driving, by the second planetary gear (22), both the second planet carrier (23) and the second outer ring gear (24) to rotate;

driving, by the second planet carrier (23), the third outer ring gear (34) to rotate; driving, by the third outer ring gear (34), the third planetary gear (32) to rotate; driving, by the third planetary gear (32), the third planet carrier (33) to rotate, meanwhile driving, by the second outer ring gear (24), the third planet carrier (33) to rotate through the second clutch (42); and driving, by the third planet carrier (33), the output shaft (55) to rotate, so as to output power.

6. A transmission method for a first gear of a parallel mode of the transmission device for a planetary gear train multi-gear hybrid vehicle according to claim 1, comprising:

arranging both the rear-end motor (54) and the engine in an operating state, the first clutch (41) and the third clutch (43) in an engaged state, the second clutch (42) in a disengaged state, and the front-end motor (53) in a non-operating state;

starting the rear-end motor (54) to drive the second sun gear (21) to rotate;

driving, by the second sun gear (21), the second planetary gear (22) to rotate;

driving, by the second planetary gear (22), the second planet carrier (23) to rotate;

driving, by the second planet carrier (23), the third outer ring gear (34) to rotate;

driving, by the third outer ring gear (34), the third planetary gear (32) to rotate;

driving, by the third planetary gear (32), the third planet carrier (33) to rotate;

transmitting, by the engine, power to the input shaft (51);

driving, by the input shaft (51), the third planet carrier (33) to rotate through the first clutch (41); and driving, by the third planet carrier (33), the output shaft (55) to rotate, so as to output the power.

7. A transmission method for a second gear of a parallel mode of the transmission device for planetary gear train multi-gear hybrid vehicle according to claim 1, comprising:

arranging both the rear-end motor (54) and the engine in an operating state, the first clutch (41) and the second clutch (42) in an engaged state, the third clutch (43) in a disengaged state, and the front-end motor (53) in a non-operating state;

starting the rear-end motor (54) to drive the second sun gear (21) to rotate;

driving, by the second sun gear (21), the second planetary gear (22) to rotate;

driving, by the second planetary gear (22), both the second planet carrier (23) and the second outer ring gear (24) to rotate;

driving, by the second planet carrier (23), the third outer ring gear (34) to rotate; driving, by the third outer ring gear (34), the third planetary gear (32) to rotate; driving, by the third planetary gear (32), the third planet carrier (33) to rotate, meanwhile driving, by the second outer ring gear (24), the third planet carrier (33) to rotate through the second clutch;

transmitting, by the engine, power to the input shaft (51);

driving, by the input shaft (51), the third planet carrier (33) to rotate through the first clutch (41); and driving, by the third planet carrier (33), the output shaft (55) to rotate, so as to output the power.

8. A transmission method for a direct-drive gear of the transmission device for planetary gear train multi-gear hybrid vehicle according to claim 1, comprising:

arranging the engine in an operating state, all the first clutch (41), the second clutch (42) and the third clutch (43) in a disengaged state, and the front-end motor (53) and the rear-end motor (54) in a non-operating state;

transmitting, by the engine, power to the input shaft (51); and driving, by the input shaft (51), the output shaft (55) to rotate through the first clutch (41), so as to output the power.

9. A transmission method for a brake recovery gear of the transmission device for a planetary gear train multi-gear hybrid vehicle according to claim 1, comprising:

arranging the rear-end motor (54) in an operating state, the third clutch (43) in an engaged state, the first clutch (41) and the second clutch (42) in a disengaged state, and both the front-end motor (53) and the engine both in a non-operating state;

driving, by the output shaft (55), the third planet carrier (33) to rotate;

driving, by the third planet carrier (33), the third outer ring gear (34) to rotate;

driving, by the third outer ring gear (34), the second planet carrier (23) to rotate;

driving, by the second planet carrier (23), the second planetary gear (22) to rotate;

driving, by the second planetary gear (22), the second sun gear (21) to rotate; and driving, by the second sun gear (21), the rotor of the rear-end motor (54) to rotate, and storing energy in a battery.

10. A transmission method for an idle power generation gear of the transmission device for a planetary gear train multi-gear hybrid vehicle according to claim 1, comprising:

arranging both the front-end motor (53) and the engine in an operating state, all the first clutch (41), the second clutch (42) and the third clutch (43) in a disengaged state, and the rear-end motor (54) in a non-operating state;

transmitting, by the engine, power to the input shaft (51);

driving, by the input shaft (51), the first planet carrier (13) to rotate;

driving, by the first planet carrier (13), the first planetary gear (12) to rotate;

driving, by the first planetary gear (12), the first sun gear (11) to rotate; and driving, by the first sun gear (11), the rotor of the front-end motor (53) to rotate, and storing energy in a battery.

\* \* \* \* \*